(12) United States Patent
Ursella

(10) Patent No.: US 12,485,571 B2
(45) Date of Patent: Dec. 2, 2025

(54) METHOD AND DEVICE FOR DETERMINING AN ANGULAR ORIENTATION OF A LOG

(71) Applicant: MICROTEC S.R.L., Bressanone (IT)

(72) Inventor: Enrico Ursella, Mestre (IT)

(73) Assignee: MICROTEC S.R.L., Bressanone (IT)

( * ) Notice: Subject to any disclaimer, the term of this patent is extended or adjusted under 35 U.S.C. 154(b) by 677 days.

(21) Appl. No.: 17/877,367

(22) Filed: Jul. 29, 2022

(65) Prior Publication Data

US 2023/0040571 A1    Feb. 9, 2023

(30) Foreign Application Priority Data

Aug. 4, 2021   (IT) .................. 102021000021143

(51) Int. Cl.
*B27L 5/02*    (2006.01)
*G06T 7/00*    (2017.01)
*G06T 7/70*    (2017.01)

(52) U.S. Cl.
CPC ............. *B27L 5/02* (2013.01); *B27L 5/022* (2013.01); *G06T 7/001* (2013.01); *G06T 7/70* (2017.01); *G06T 2207/30161* (2013.01)

(58) Field of Classification Search
CPC . B27L 1/005; B27L 5/022; B27L 5/02; G06T 7/001; G06T 7/70; G06T 2207/30161
See application file for complete search history.

(56) References Cited

U.S. PATENT DOCUMENTS

2009/0303497 A1\* 12/2009 Hamalainen ........... G01B 11/10
356/635
2010/0111367 A1\* 5/2010 Hiraoka ............. G01B 11/2522
382/106

(Continued)

FOREIGN PATENT DOCUMENTS

WO      2008/027150 A2    3/2008
WO      WO-2008049502 A1 \* 5/2008  .............. B27L 1/007

OTHER PUBLICATIONS

Schraml, R., et al., "On rotational pre-alignment for tree log identification using methods inspired by fingerprint and iris recognition", Machine Vision and Applications, 2016, vol. 27, pp. 1289-1298.

*Primary Examiner* — Michael P LaPage
(74) *Attorney, Agent, or Firm* — Chrisman Gallo Tochtrop LLC

(57) ABSTRACT

Method for determining an angular orientation of a log (2) about one of its longitudinal development axes, comprising a first generation step, during which one or more first digital images are generated of the lateral surface of the log placed in a reference position, using one or more first digital photographs, a second generation step, during which one or more second digital images are generated of the lateral surface (1) of the log (2) placed in a second position using the one or more second digital photographs, a step of comparing the one or more second digital images with the one or more first digital images, and a step of determining the angular orientation of the log (2) in the second position with reference to a reference angular orientation of the log (2) in the reference position, based on information related to the first digital images and the second digital images for which a match was identified. Also claimed is a device which can implement is programmed to perform the follow- (Continued)

ing of the steps described above: the second generation step, the comparison step and the determination step.

13 Claims, 8 Drawing Sheets

(56) References Cited

U.S. PATENT DOCUMENTS

| | | | | |
|---|---|---|---|---|
| 2013/0333805 | A1* | 12/2013 | Gagnon | G01N 21/8986 |
| | | | | 144/357 |
| 2018/0311860 | A1* | 11/2018 | Strasky | B27B 31/06 |
| 2022/0009120 | A1* | 1/2022 | Konishi | B27B 31/06 |
| 2022/0065841 | A1* | 3/2022 | Clement | G06F 18/41 |
| 2022/0335586 | A1* | 10/2022 | Yahashi | G06T 7/11 |

* cited by examiner

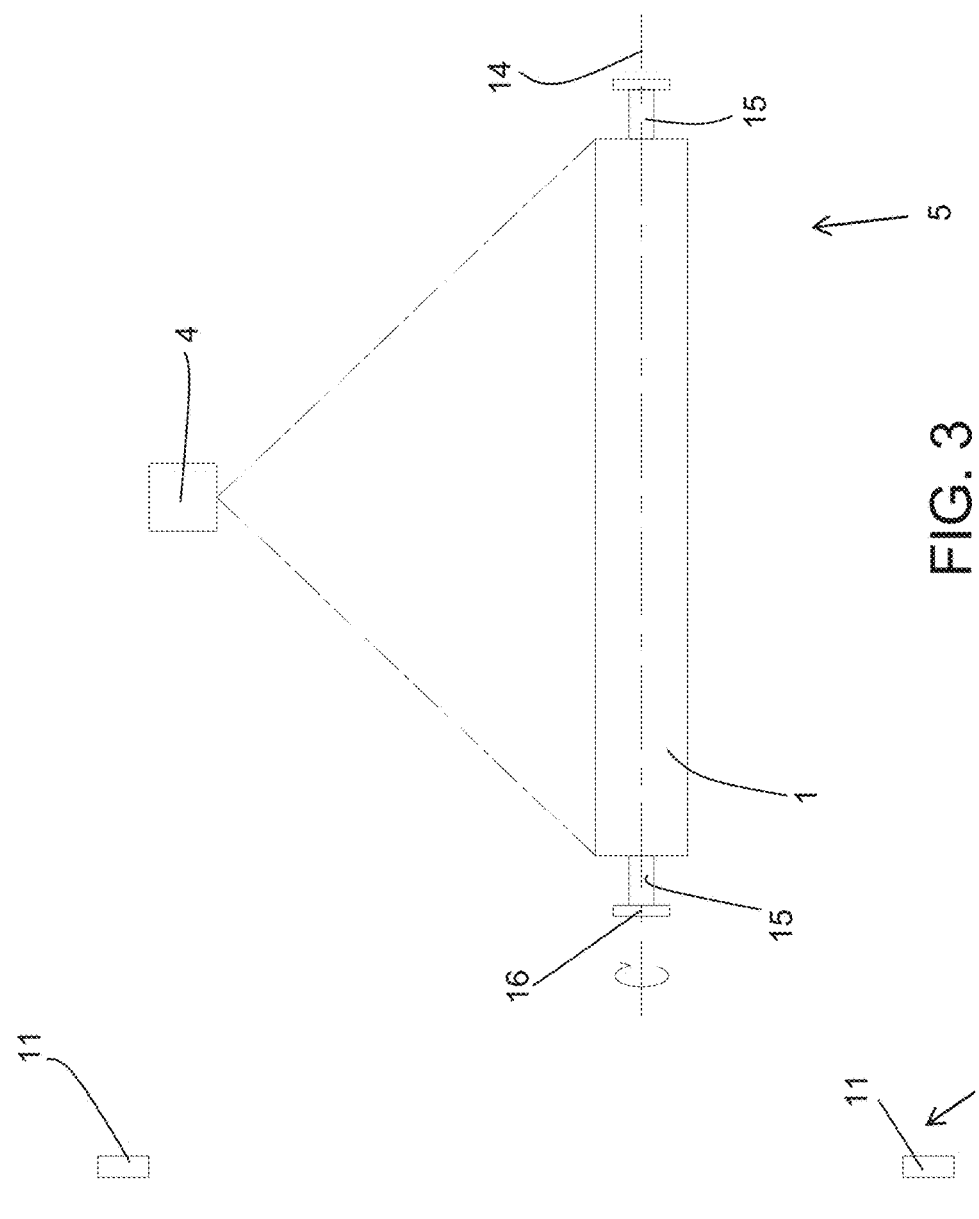
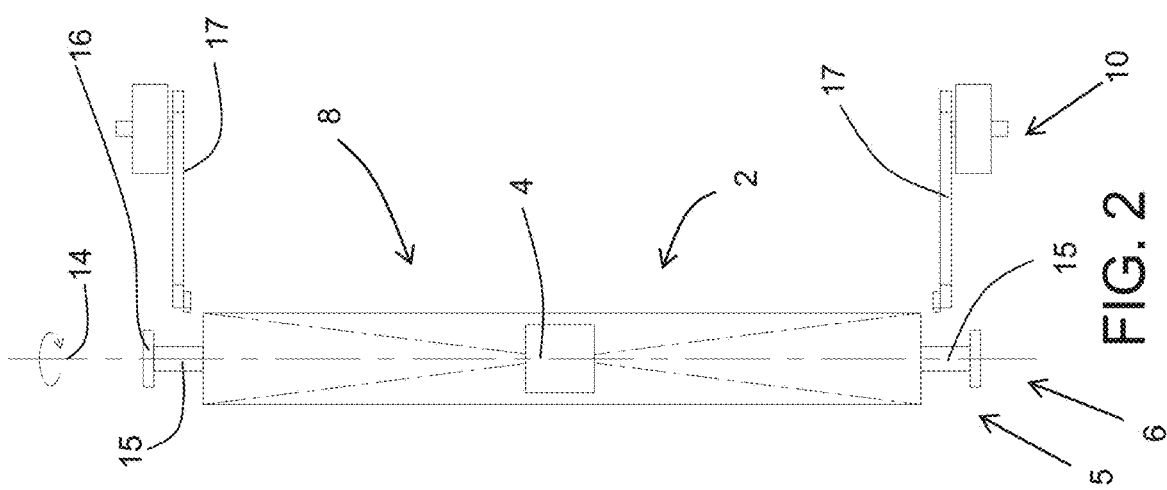
FIG. 3
FIG. 2

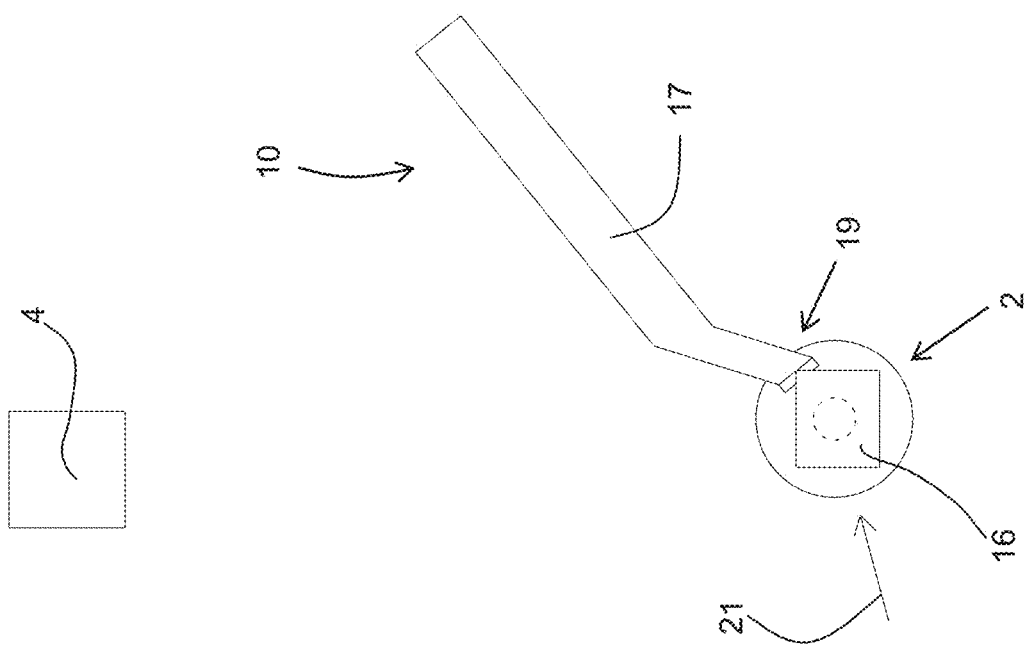
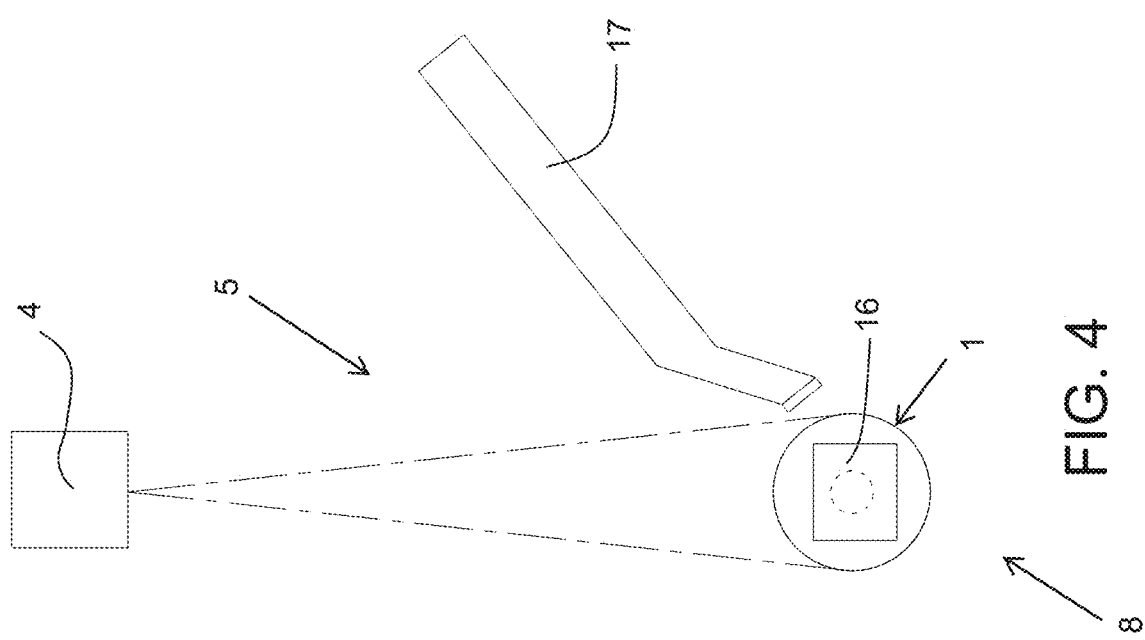

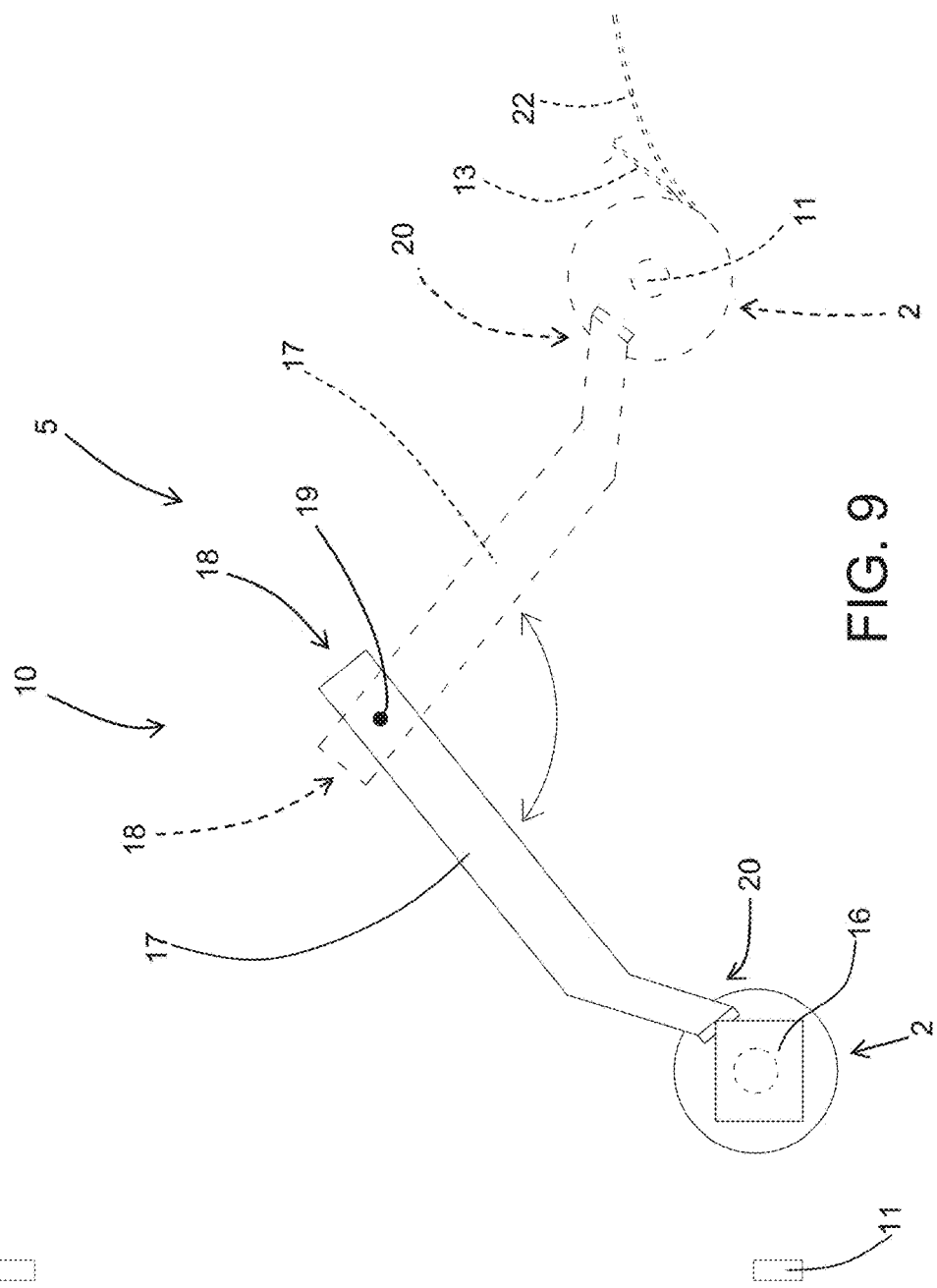
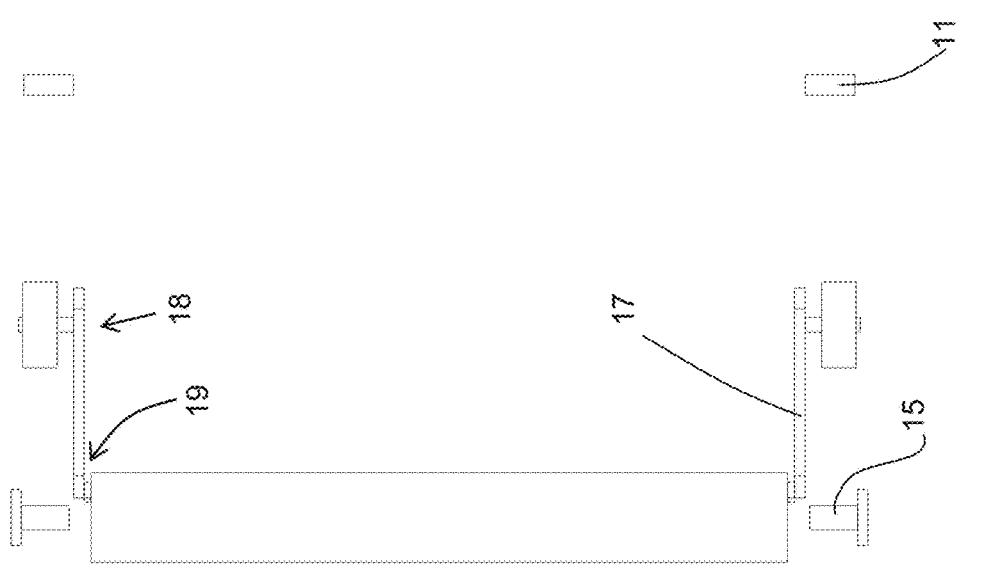

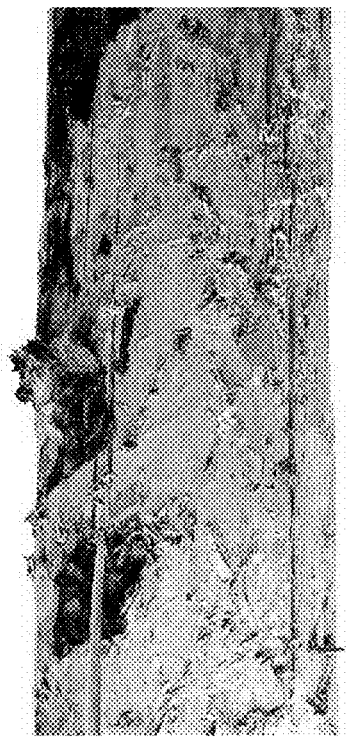

METHOD AND DEVICE FOR DETERMINING AN ANGULAR ORIENTATION OF A LOG

The present invention relates to a method and a device for determining an angular orientation of a log, and is applied in the timber processing industry. As is known, the increasing automation of timber processing plants, which is aimed at maximising the value of the products obtained, has led over the years to the development of many techniques for optimising timber processing. One aspect that is common to almost all optimised processing techniques usable for logs is the need to know the position of the log with good accuracy. This means not only knowing where the log is located, but, more importantly, knowing how the log is oriented relative to a central axis developing longitudinally along the log.

In the context of the present description, when making reference to a longitudinal development or longitudinal axis in relation to a log, this means the direction coinciding with the direction of growth in the height of the plant of which the log was part; which is to say, the direction generally perpendicular to its leading faces.

While identifying the longitudinal axis of the log is a common operation, understanding how the log is actually oriented around it is not simple.

In particular, it may not be straightforward to identify how a log is rotated about the longitudinal axis as it passes between two stations of a plant or, indeed, different plants.

Indeed, in many applications the optimisation of the parameters to be used for processing a log are optimised at an examination station separate and distant from the actual machining station. At the examination station, the features of interest for the specific processing operation (e.g. the position of knots or other defects within the log) are determined relative to the position the log assumes at that time. The subsequent operation of identifying the optimised processing parameters then relates to the position of the log in the examination station. Consequently, when the log is transferred to the processing station, it is necessary to understand how it is oriented before taking any action.

Various technical solutions have been proposed over time to try to achieve this outcome.

According to some of these, the orientation of the log is recognised by comparing the log's end faces that are visible at different stations, either by spraying a coloured reference line on one of them or by referring to their biometric features (as described, for example, in Rudolf Schram) et al., "On rotational pre-alignment for tree log identification using methods inspired by fingerprint and iris recognition", Machine Vision and Applications (2016) 27:1289-1298, DOI 10.1007/s00138-016-0814-2). This solution can be effective in all situations where the end face of the log can be freely observed. This is not the case, however, for all processing procedures where the log is held by an apparatus at the end faces themselves. One example of this type are peeling apparatuses, wherein the log, after being loaded into a loading station of the apparatus, is held at its ends by two spindles that, among other things, also have the task of orienting the log in the best way possible for its subsequent transfer to a cutting station of the apparatus itself (the transfer takes place with a controlled rigid motion). Therefore, in the case of peeling apparatuses, to try to recognise the orientation of the logs a 3D scanner is generally mounted at the entry station. As the spindles rotate the log around a longitudinal axis, the 3D scanner detects the conformation of its lateral surface by creating a virtual three-dimensional model. The three-dimensional virtual model thus created is then compared with similar three-dimensional virtual models previously created using an analogous 3D scanner associated with the examination station.

However, this known technology also has some drawbacks.

While this is absolutely effective where logs have an irregular external surface that can be unambiguously characterised, this three-dimensional external surface scanning technique proves entirely unsuitable for enabling the recognition of the orientation of logs that have a remarkably regular external surface, as is common at least for some types of plants.

Another case where the end face of the log is not visible in all control stations is where, between two stations, the log is cut crosswise into shorter pieces. From a single starting log, several shorter pieces are generated. One or both ends of the new pieces were clearly not visible when they were passed to the first station, so their image cannot be used.

In this context, the technical purpose of the present invention is to implement a method and a device for determining an angular orientation of a log which offer a solution to the drawbacks mentioned above.

In particular, the technical purpose of the present invention is to implement a method and a device for determining an angular orientation of a log, which can be adopted irrespective of whether the end faces are visible.

A further technical purpose of the present invention is to implement a method and a device for determining an angular orientation of a log, which can be used successfully also for logs which have an extremely regular lateral surface such that the log is not recognisable by way of three-dimensional profiling.

The technical purpose and the aims indicated above are substantially achieved by a method and a device for determining an angular orientation of a log in accordance with the contents of the accompanying claims.

Preferred embodiments are described in the dependent claims.

Further features and the advantages of the present invention will become more apparent upon careful reading of the detailed description of several preferred, non-limiting embodiments of a method and a device for determining an angular orientation of a log, as shown in the accompanying drawings, in which:

FIG. 2 shows a schematic view from above of some parts of a peeling apparatus equipped with a device according to the present invention, during a first work step;

FIG. 3 shows a side view of a part of the apparatus in FIG. 2, as viewed from the left;

FIG. 4 shows a front view of a part of the apparatus in FIG. 2;

FIG. 5 shows the parts in FIG. 4, in a second work step subsequent to the first work step;

FIG. 8 shows a view from above of the parts in FIG. 7, during a fourth work step subsequent to the third work step;

FIG. 9 shows a front view of the starting (continuous line) and end (dashed line) positions of each part in FIG. 8, during a subsequent fifth work step;

Figure 1:
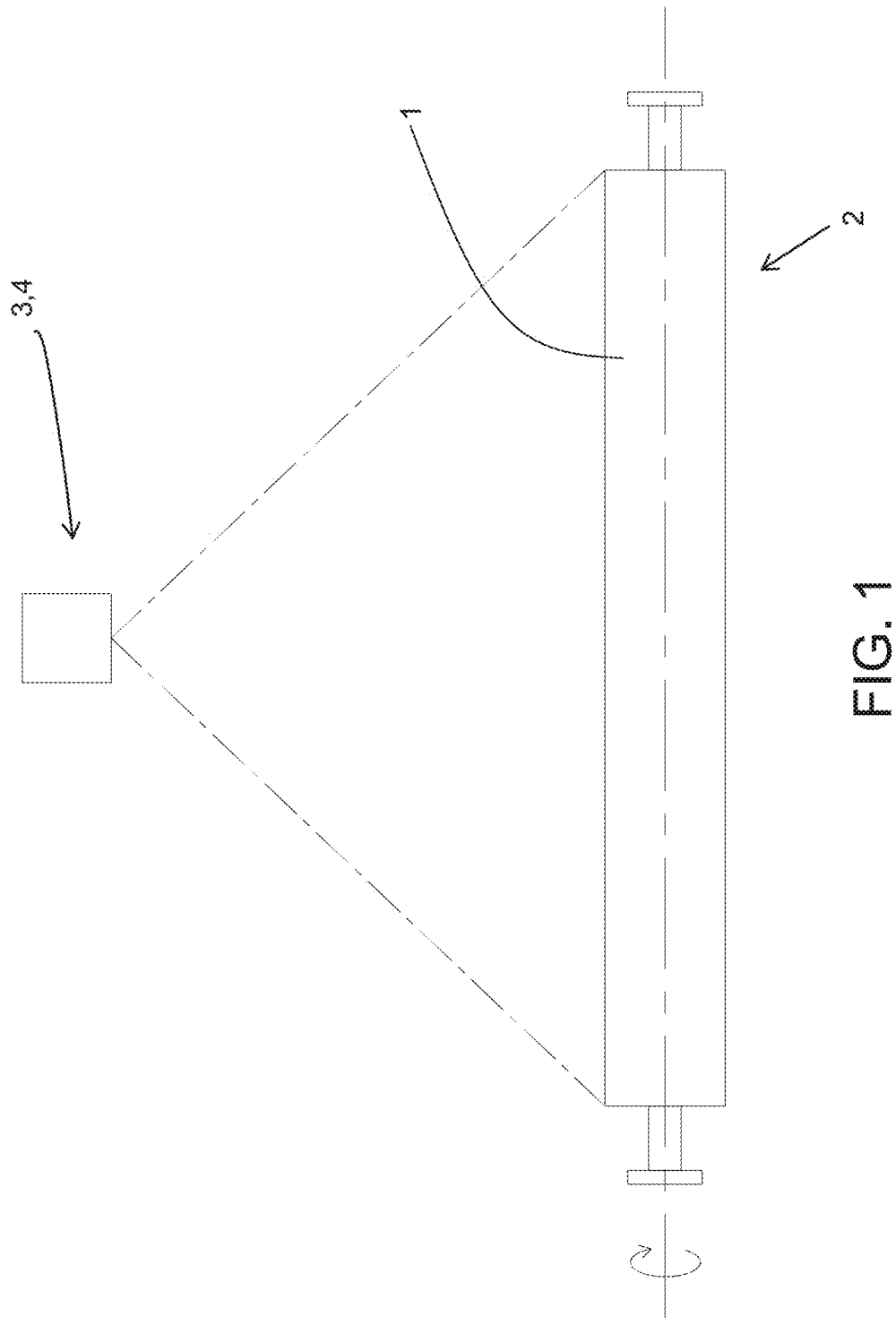
FIG. 1 shows a schematic front view of some parts of a device for determining an angular orientation of a log, made according to the present invention.

FIGS. 13 to 18 successively show six different photographs of a portion of the lateral surface of a single log, obtained by rotating the log about its own longitudinal axis with an identical angular step between each.

For the sake of clarity, the method that is the object of the present invention will herein be described first, followed by the device. Nevertheless, the description made in relation to the method or the device should be considered as also referring to the device and the method, respectively (where technically possible).

The technical solution underlying both the method and the device described below is based on using the external appearance of the lateral surface 1 of a log 2 as a characterising feature capable of allowing the arrangement of the log 2 to be determined relative to one of its longitudinal axes. In particular, it has been devised to compare the orientation of the lateral surface 1 in a second position with the orientation that the lateral surface 1 had in a reference position, in order to determine the extent and way in which the log 2 in the second position is rotated about its longitudinal axis compared to when it was in the reference position. Consequently, any information about the log 2 which was determined when the log 2 was in the reference position (e.g.: knot distribution, orientation of a peeling pattern, etc . . . ), can be carried over to the second position (in practice, this is a rigid geometric transformation).

It should also be noted that the description below applies indifferently both in the case where the log 2 in the second position is the same as the log 2 that was previously examined in the reference position, and in the case where the log 2 in the second position consists of an axial piece of a log 2 that was previously examined in the reference position; this may occur, for instance, if a larger log 2 has been cut into several axial pieces after having passed through the reference position.

The method described in the present invention comprises a number of work steps, the first of which is a first acquisition step that is performed when the log 2 is in the reference position. Advantageously, the reference position may be a position in which the log 2 is located when it undergoes an examination step, or a position in which the log 2 has a known orientation relative to the orientation it had or will have (depending on whether the examination step is performed before or after) while performing the examination step (for example, as the two are separated only by a known rigid motion of the log 2).

During the first acquisition step, one or more first digital images are acquired of the lateral surface 1 of the log 2 placed in the reference position. Each first digital photograph is acquired by viewing the log 2 from a relative first viewpoint which has a known position corresponding to the lens position of a first digital camera used for that purpose. The first acquisition step may be performed using one or more first digital cameras 3.

As also described in more detail below, in some embodiments, one or more first digital photographs are acquired by observing the log 2 from a single first viewpoint placed radially relative to the longitudinal axis. Preferably, the one or more first digital photographs show the outer appearance of the lateral surface 1 of the log 2 along a longitudinal strip equal in length to the length of the log 2. This acquisition may be made either by acquiring a single first digital photograph, or by acquiring a plurality of first digital photographs each affecting only a portion of the longitudinal development of the log 2.

In some embodiments, on the other hand, a plurality of first digital photographs are acquired by observing the log 2 from a plurality of different radial angles relative to the longitudinal axis, preferably distributed in such a way as to acquire at least one photograph for each point of an entire tubular portion of the lateral surface 1 of the log 2; in other words, the first digital photographs, taken together, show the entire surface of the tubular portion of the lateral surface 1 of the log 2. Moreover, as in the previous case, at each angular acquisition position (first viewpoint) one or more first digital photographs may be acquired, so as to cover the length of the log 2 in whole or in part.

Furthermore, in other embodiments the same result as described above may be obtained by rotating the log 2 on itself about the longitudinal axis and by using, several times during the rotation, one or more first digital cameras 3 placed at single angular position.

The method then comprises a first generation step, during which one or more first digital images are generated of the lateral surface (1) of the log (2) placed in the reference position. The first digital images are generated using the one or more digital first photographs.

In some embodiments, the one or more first digital images coincide with the first digital photographs. This means that each digital first digital image may match either a single digital first photograph, or the union of several digital first photographs (for example, in the case where several digital first photographs are acquired at the same angular position to cover the entire longitudinal length of the log 2).

In some embodiments, on the other hand, the one or more first digital images are created by generating one or more first virtual digital photographs of the lateral surface 1 of the log 2, which are then used in a similar manner as described above. The first virtual digital photographs may be created by processing first real digital photographs acquired from different viewpoints, in particular from viewpoints representing a, angular position different from but close to the longitudinal axis of the log 2, substantially as if they were two images acquired using a stereoscopic view system.

Using know image production techniques, by having two digital photographs of the same surface, acquired via stereoscopy, it is possible to generate a virtual digital photograph that corresponds to what could be observed from an intermediate virtual point of view between the two real viewpoints. For example, first real digital photographs acquired from two viewpoints angularly offset by 10° about the longitudinal axis of the log 2 may be used to create an additional nine virtual digital photographs corresponding to what might be observed from viewpoints interposed between the two and spaced 1° apart.

The steps described hereto enable the method to create a series of images to be used as a reference against which to subsequently evaluate the angular orientation of the log 2 in the second position, which may reached—for instance—after a movement of the same. In some applications, the first generation step may also be at least partly performed after some of the steps described below and, in particular, during the comparison step, as also repeated below.

While the first acquisition step is advantageously performed using the first digital cameras 3, the first generation step may advantageously be performed by an electronic unit that may comprise one or more computers.

When the log 2 has reached the second position, where we want to determine the angular orientation of the log 2 itself, the method provides first, of all, for a second acquisition step, during which one or more second digital photographs are acquired of the lateral surface 1 of the log 2 using second digital cameras 4. In this case, too, each second digital photograph is acquired by viewing the log 2 from a relative second known viewpoint position. Advantageously, both the first viewpoints and the second viewpoints are positioned on a line radial to a longitudinal axis of the log 2. All of the considerations set out above in relation to the first digital photographs also apply to the acquisition of the second digital photographs.

Subsequently, the method provides for the performance of a second generation step, during which one or more second digital images are generated of the lateral surface 1 of the log 2, which is placed in the second position, using the one or more second digital photographs. All of the considerations mentioned above for the first generation step are also valid for the second generation step (they should be regarded as applying to the second digital photographs rather than the first digital photographs).

In some embodiments, in the first generation step a plurality of first digital images is generated and in the second generation step only one second digital image is generated.

In other embodiments, in the first generation step only one first digital image is generated, whereas in the second generation step a plurality of second digital images is generated.

In both of the cases just described, the digital images from which the plurality is acquired (be it the first digital images or the second digital images) are advantageously acquired in such a way as to cover an entire tubular portion of the lateral surface 1 of the log 2.

The second acquisition step is carried out using one or more second digital cameras 4. The second generation step is instead actuated by an electronic unit which, according to need, can be the same as the electronic unit used in the first generation step or can be a different device (which may comprise one or more computers).

Once the second generation step is complete, the method provides for a comparison step, during which the one or more second digital images are compared to the one or more first digital images.

The comparison step is also advantageously performed by an electronic unit, which may or may not coincide with the one responsible for the generation phase, and which may comprise one or more computers.

The comparison step is performed to identify a match between a second digital image of the log 2 placed at the second position and a first digital image of the same log 2 placed at the reference position.

The comparison step can be performed with any method of image comparison.

In general, it will only be possible to identify an exact match between the first digital image and the second digital image if the two images have been acquired from respective viewpoints positioned identically relative to the longitudinal axis of the log 2, or at least at an angular distance from each other that is less than the measurement resolution. In reality, however, this is highly unlikely to occur.

As a consequence, the comparison step is advantageously performed by first checking whether the same surface features of the log 2 are present in the first and second images, and then checking what the deviation is between the two images.

In particular, since the first digital images and the second digital images are acquired in the visible light range, significant surface features are advantageously identified based on the chromatic features of the surface of the log 2.

FIGS. 13 to 18 show the same axial portion of a log 2 photographed from the same angle as it rotates in such a way that the upper portion approaches the viewer. Each photograph is rotated by approximately 10° relative to the previous one.

As demonstrated by these figures, the external surface of a log 2 is typically rich in inconstant areas with characteristic colouring. This makes it possible to identify unique feature points in each acquired image. These feature points can be found, and matched, in images taken by two separate cameras at different times. Some applications may also allow for a marking step prior to the first acquisition step, in which an artificial marking is applied to the external surface of the log 2 to make it more recognisable. By way of example, the marking may be made by creating a random texture on the surface of the log, for instance by uncontrolledly spraying a coloured paint (preferably in contrast to the average colour of the log 2) on the lateral surface of the log.

Selecting feature points (or "keypoints") in an image, calculating a set of numbers that describe their appearance ("descriptors") and selecting the best association between keypoints in two images, based on the similarity between their descriptors (selected based on the electronic recognition of the same real points in different images), is a known art in computer vision and therefore will not be described in further detail here.

The comparison step is advantageously performed by comparing a single image of a portion of the lateral surface 1 of the log 2 acquired at one location (which may be a first digital image or a second digital image, respectively) with a plurality of images of the same surface acquired at a different location and which collectively show the appearance of the entire lateral surface 1 or at least a tubular portion of it.

As with all computer vision techniques, in the comparison step, too, there can be considered to be a match between two images when the score of similarity, or difference, between the two images falls within a prefixed threshold.

The magnitude of this threshold will depend on the degree of precision with which the angular orientation of the log 2 is to be identified. For example, if it is necessary to identify the angular orientation with a maximum deviation of 1°, there will be a match when the first digital image and the second digital image are rotated relative to each other by no more than 1°. For this purpose, if only one first digital image is available, it will be advisable for the second digital images to include at least three hundred and sixty digital images (real or virtual) referable to digital photograph acquisitions made from viewpoints uniformly distributed around the longitudinal axis. Similarly, if only one second digital image is available, it will be advisable for the first digital images to include at least three hundred and sixty digital images (real or virtual) referable to digital photograph acquisitions made from viewpoints uniformly distributed around the longitudinal axis.

In some applications, on the other hand, the starting resolution may be lower (for instance, equal to an image every 5° or 10°, for a total of seventy-two or thirty-six digital images respectively) and, only during the comparison phase, further virtual images may be generated (in performing the first or second generation phase) exclusively for viewpoints angularly included between the two images for which the highest match was obtained; these new virtual images can be generated by taking into account a step that is coherent with the precision intended to be obtained (for example, equal to 1° or lower).

For example, where given a first digital image acquired from a certain first viewpoint, the comparison step will identify two second digital images for which the similarity, or difference, score is best. These two second images correspond to the second viewpoints closest to the first viewpoint to be identified; in particular, considering a direction of rotation around the longitudinal axis, they will be placed one a little before and one a little after the first viewpoint identified. At that point, by intensifying the analysis only in the angle of interest, it will be possible to identify a further second viewpoint that corresponds to the first viewpoint sought at an angle of less than 1°.

Therefore, at the end of the comparison step, a pair will be identified that includes a first digital image and a second digital image for which a match has been verified. For such a pair of images, the angular positions about the longitudinal axis, of the one or more first viewpoints and of the one or more second viewpoints respectively, will also be known.

Once the comparison step is complete, the method comprises a determination step, during which the angular orientation of the log 2 in the second position is determined, with reference to the reference angular orientation of the log 2 in the reference position.

The determination step is performed based on information related to the first digital images and the second digital images for which a match was identified. In particular, since the position of the second viewpoints relative to the log 2 placed in the second position is known, once the comparison step has enabled the second digital image matching a first digital image to be identified, knowledge is gained of which second viewpoint it was acquired and, therefore, what is the position of the log 2 relative to said second viewpoint. By combining this information with the knowledge of the angular orientation of the log 2 at the reference position at the time of acquisition of the first digital image, as well as the knowledge of the position of the first and second viewpoints relative to the log 2, it is immediately possible to determine the angular orientation of the log 2 at the second position relative to that which it had at the reference position.

Therefore, the determination step is advantageously carried out by processing stored information relating to the first viewpoints and the second viewpoints from which the first digital photographs and the second digital photographs were acquired, respectively, as were used to generate the first digital images and the second digital images, respectively, for which the match was identified.

In some applications, the method may further comprise a compensation step that may be carried out in conjunction with the first acquisition step and/or the second acquisition step, respectively.

During the compensation step, the respective (first and/or second) digital photographs are processed according to known information, in such a way that the first digital photographs and the second digital photographs appear as if they had been obtained from viewpoints identically distanced from the longitudinal development axis.

This arrangement may be useful, for example, the log 2 is supported differently between the first position and the second position; for instance, where in one case its lateral surface 1 rests on a support and in the other case it is axially supported with spindles. Indeed, depending on the size of the log 2, the distance between the camera and the surface varies, varying differently between the two positions, making it difficult to compare the first images and the second images in the absence of any compensation.

The compensation step can therefore be performed by combining the acquisition step with a step of detecting the dimensions of the log 2 and/or its distance from the cameras; this can be performed using any known methodology (three-dimensional scanner, image processing, etc . . . ).

While the method described so far is advantageously applied where the identity of the log 2 placed in the second position is known, this should not be considered limiting. Indeed, the context of the present invention also includes applications in which the identity of the log 2 is not known, but rather it is known only that it forms part of a plurality of logs 2. In this case, the method involves determining not only the angular orientation of the log, but also its identity. In addition, some embodiments, which are not described in the accompanying claims but which the applicant reserves the right to protect by filing subsequent divisional patent applications or claiming the priority of the present application, provide that the method may be used to determine only the identity of the log and not to determine its angular orientation; in this case, it is the determination step that changes.

To determine the identity of the log (in addition to determining the angular orientation or otherwise, the method provides that during the comparison step the one or more second digital images of the log 2 in the second position are compared to the one or more first digital images relating to at least one part of the plurality of logs 2 previously photographed in the reference position, for the purpose of identifying a match between a second digital image of the log 2 placed at the second position and a first digital image of one log 2 out of the plurality of logs 2. As mentioned above, the comparison may involve only a part of the plurality of logs 2; this occurs, for example, where the comparison step is planned to be interrupted at the moment the match is found (although the comparison step may also be performed for all logs 2 in the plurality to select the best match). Once the match as been identified, the method provides that during the determination step, the log 2 placed in the second position is identified with the log 2 out of the plurality of logs 2 to which the first digital image relates and for which a match with a second digital image has been identified.

The method described so far is advantageous used as part of a procedure to perform a processing operation on a log 2, which provides for an uncontrolled movement between a first position, in which the log 2 is examined for the purpose of determining the optimised processing parameters, and a second position, in which the log 2 is actually processed.

In general, the procedure first of all comprises an examination step during which the log 2 is examined to determine features of interest, and an optimisation step, during which—based on the features of interest—optimised parameters for processing the log 2 are determined. Advantageously, the optimised parameters include optimised positioning.

By way of example, in the examination step, the position of the knots within the log 2 may be determined, and in the optimisation step, the cutting pattern that maximises the value of the timber obtainable in view of the known distribution of the knots within the log 2 may be determined. Where the processing consists of an operation of peeling a log 2 to make a reel of sheet wood, the optimised parameters may be: the thickness of the sheet, the position of an optimised rotation axis about which the log 2 is rotated during the processing, the processing start angle, the start and/or end radius of cutting the sheet (the rest of the wood being dealt with as scrap), etc . . .

Both identifying the distribution of knots and determining the cutting pattern require an angular reference which, in many applications, is made to coincide with a known reference (e.g. a vertical or horizontal half-plane exiting the longitudinal axis of the log 2). At the end of the optimisation phase, it will therefore be known that—during the cutting phase—the log 2 must be rotated by a certain angle (angle α—including modulus and direction) relative to its position during the examination phase.

The processing procedure therefore includes a positioning step, during which the log (2) is oriented according to the optimised positioning, and a processing step during which the log (2), originating from the optimised positioning, is machined based on the previously determined optimised parameters.

According to the preferred embodiment of the present invention, the method for determining the angular orientation is used to determine the angular orientation of the log 2 prior to performing the positioning step, in order to obtain starting information to correctly perform the positioning step itself. Potentially, it can also be used to identify the log 2 from among a plurality of logs on which the examination and optimisation steps are performed.

In performing the method, the reference position is associated with the position of the log 2 during the examination phase, while the second position is the position assumed by the log 2 before the start of the positioning phase. Using the method described above, it is then possible to determine the extent to which the log 2 has been rotated about the longitudinal axis in passing from the reference position to the second position (angle β—including modulus and direction).

At that point, it is easy to perform the positioning step, taking into account the angular orientation of the log 2 determined during the determination step. Indeed, it will be sufficient to rotate the log 2 by the difference between the optimised rotation angle and the angle by which it is already rotated (angle α–β—naturally taking into account the modulus and direction).

Depending on the implementations, the examination and positioning steps can be performed at different points of the same processing plant or at different plants.

In one preferred embodiment (as referred to in accompanying FIGS. 2 to 12, the processing comprises an operation of peeling the log 2 to produce a continuous sheet of wood.

In other embodiments, the processing may be a different operation of cutting the log 2.

Turning now to the device 5 for determining an angular orientation of a known log 2 (identified hereinafter as the "device 5"), with reference to its longitudinal development axis, this is advantageously capable of carrying out at least the second part of the method described above, namely the steps carried out after the log 2 has reached the second position (the first digital images may in fact be generated by a different apparatus).

The device 5 comprises, first of all, a supporting member 6 for the log 2, and one or more second digital cameras 4 associated with the supporting member 6 for acquiring one or more second digital photographs of the lateral surface 1 of the log 2 placed on the supporting member 6.

In some embodiments, such as that shown in the accompanying FIGS. 2 to 12, the supporting member 6 is configured to controllably rotate the log 2 about an axis parallel to the longitudinal development axis of the log 2, and the second digital cameras 4 are fixed relative to the axis about which the log 2 rotates.

Additionally, the device 5 includes an electronic unit (not shown) connected to a digital storage (not shown) and the one or more second digital cameras 4. The digital storage is configured to store, for each log 2, the one or more first digital photographs of the lateral surface 1 of the log 2 placed in the reference position or the one or more first digital images of the lateral surface 1 of the log 2 placed in the reference position.

The electronic unit is programmed to perform the following of the steps described above: the second generation step, the comparison step and the determination step. If provided, the electronic unit can be programmed to also carry out the compensation step in relation to the second digital photographs. In some embodiments, for each log (2), the digital storage contains, in use, a plurality of first digital images and the electronic unit is programmed to generate only one second digital image.

In some embodiments, on the other hand, the electronic unit is programmed to generate a plurality of second digital images and the digital storage, in use, contains only a first digital image for each log 2.

For all first images, the digital storage also includes information about the corresponding position of the log 2.

In some embodiments, he second digital cameras 4 are configured to acquire at least one photograph of an entire tubular portion of the lateral surface 1, advantageously of the entire lateral surface.

Also with respect to the device, the electronic unit may be programmed to identify the log 2 from among a plurality of logs whose data are stored in the digital storage. As with the method, the device is also envisaged to have some embodiments which are not described in the accompanying claims but which the applicant reserves the right to protect by filing subsequent divisional patent applications or claiming the priority of the present application, wherein the device is capable of determining the identity of the log but not determining its angular orientation; also in this case, what changes is the performance of the determination step by the electronic unit.

Where it is envisaged that device will be able to identify the log 2 from among a plurality of logs 2, the digital storage is configured to store, in use, one or more first digital photographs or one or more first digital images of the lateral surface 1 of a plurality of logs 2 placed in the reference position. In turn, the electronic unit is further programmed to, during the comparison step, compare the one or more second digital images of the log 2 in the second position to the one or more first digital images relating to at least one part of the plurality of logs 2 to identify a match between a second digital image of the log 2 placed at the second position and a first digital image of one log 2 out of the plurality of logs 2 placed at the reference position. Finally, the electronic unit is also programmed to identify, during the determination step, the log 2 placed in the second position with the log 2 out of the plurality of logs 2 to which the first digital image relates and for which a match with a second digital image was identified.

According to a particularly preferred embodiment, the device 5 described herein is part of a log peeling apparatus 7, such as that shown in the accompanying figures.

Similar to known log peeling apparatuses, the log peeling apparatus 7 includes three main components: a loading station 8, a cutting station 9 and a log transfer device 10 from the loading station 8 to the cutting station 9.

Supporting structure, which may comprise one or more parts, supports the loading station 8, the cutting station 9 and the transfer device 10.

At the loading station 8, the apparatus, in use, receives each log 2 to be peeled, advantageously from a feeding line. The loading station 8 is advantageously configured to receive one log 2 at a time.

In the cutting station 9, a cutting device 5 is present which, in use, performs a spiral cut of the log 2 while the log 2 is rotated about a first rotation axis 13, similarly as is previously envisaged by known peeling apparatuses.

To rotate the logs, the cutting station 9 includes a pair of first spindles 11 mounted on the supporting structure. The first spindles 11 are motorised and coaxial relative to a first rotation axis 13. The first spindles 11 are also axially spaced apart and axially movable relative to each other, between a first rest position and a first working position. When in the first rest position, the first spindles 11 are spaced more widely apart than when in the first working position, allowing a log 2 with end faces facing the first spindles 11 to be inserted between them. When in the first working position, the first spindles 11 are configured to axially hold the log 2 by clamping it at the end faces. Furthermore, when in the first working position, the first spindles 11 may rotate about the first rotation axis 13 to rotate the log 2 on itself. Since the peeling apparatus 7 may be used to process logs of different lengths, the first spindles 11 may advantageously assume a plurality of distinct first working positions, each characterised by having a different distance from each other.

The cutting device 5 is mounted on the supporting structure and is operatively associated with the pair of first spindles 11 in order to move relative to them during the rotation of the log 2 about the first rotation axis 13 and, thus, peel the log 2 rotated by the first spindles 11. As in known peeling apparatuses, also in the one described in the present invention the cutting device 5 advantageously comprises a blade 12 slidable along a ring-shaped trajectory in which an active section can be identified at the log 2. Said active section lies in a plane that is oriented, at least primarily, tangentially relative to the first rotation axis 13 and that is movable relative to the first rotation axis 13 in order to gradually decrease the distance and thus perform the spiral cut.

The cutting station 9, the loading station 8 and the transfer device 10 are associated among each other in such a way as to interact, in use, to position the log 2 in the cutting station 9. In particular, they advantageously interact in such a way as to control the position of the first rotation axis 13 relative to the log 2, preferably by making it coincide with an optimised rotation axis that has been determined for the log 2 itself. In some applications, they may also interact in such a way that the cutting device 5 starts cutting the log 2 at a specific cut start position that has also been previously optimised (advantageously during a previous optimisation step). Advantageously, the cut start position can be defined with a radial distance relative to the optimised rotation axis, and with an angle of rotation about the optimised rotation axis (in essence, these are polar coordinates expressed relative to a reference system integral with the log 2).

In some embodiments, such as that shown in the accompanying figures, the position of the first rotation axis 13 relative to the supporting structure is fixed, as is the position of the transfer device 10 relative to the cutting station 9. In that case, the interaction enabling the position of the log 2 to be controlled is made between the transfer device 10 and the loading station 8; in particular, the latter will advantageously be able to feed the log 2 into the transfer device 10 in any possible position and orientation.

The loading station 8 includes a device 5 for axially rotating the log 2 about a second rotation axis 14.

In some embodiments, the axial rotation device 5 comprises a pair of second spindles 15 mounted on the supporting structure. The second spindles 15 are entirely analogous to the first spindles 11 in terms of their motion relative to each other and relative to the log 2.

The second spindles 15 are motorised and coaxial relative to the second rotation axis 14. The second spindles 15 are also axially spaced apart and axially movable relative to each other, between a second rest position and a second working position. When in the second rest position, the second spindles 15 are spaced more widely apart than when in the second working position, allowing a log 2 with end faces facing the second spindles 15 to be inserted between them. When in the second working position, the second spindles 15 are configured to axially hold the log 2 by clamping it at the end faces. Furthermore, when in the second working position, the second spindles 15 may rotate about the second rotation axis 14 to rotate the log 2 on itself. Finally, the second spindles 15 may also advantageously assume a plurality of distinct second working positions, each characterised by having a different distance from each other.

Advantageously, the second spindles 15 are mounted on a supporting body 16 that is movable in a plane perpendicular to the second rotation axis 14. This displacement of the supporting body 16 allows a different positioning of the log 2 to be determined relative to the log transfer device 10, as explained in more detail below.

In these applications, the log transfer device 10 is configured to transfer a log 2 by picking it up from the pair of second spindles 15 and releasing it to the pair of first spindles 11.

Preferably, the transfer device 10 comprises two movable arms 17, which are movable between a pick-up position, at which they are associated with the loading station 8 to pick up a log 2 supported by the second spindles 15, and a release position, at which they are associated with the cutting station 9 to allow the log 2 to be picked up by the first spindles 11. In some embodiments, at one of their secured ends 18, the movable arms 17 are rotatably connected to the supporting structure according to a third rotation axis, which is parallel to both to the first rotation axis 13 and the second rotation axis 14, and they may swing between the pick-up and release positions about the third rotation axis 19. In particular, two operational ends 20 of the movable arms 17, which are opposite to the secured ends 18, swing between the two positions. The movable arms 17 are also advantageously movable relative to each other along the third rotation axis 19 in order to bring the operational ends 20 closer to and further away from each other and consequently to jam a log 2 between the operational ends 20 or to free it. In both the pickup position and the release position, the operational ends 20 are also eccentric relative to the second spindles 15 and the first spindles 11, respectively, so that they can freely interact with the log 2.

In these embodiments, the displacement of the supporting body 16 of the second spindles 15 allows a different positioning of the log 2 to be determined relative to the log movable arms 17 placed in the pickup position.

The axial rotation device 5 also constitutes the supporting member 6 for the device 5 for determining the angular orientation.

Additionally, the peeling apparatus 7 comprises the electronic unit (not shown) that is also part of the device 5 for determining the angular orientation; the electronic unit is also connected to the device 5 axially rotating the log 2 to control its operation. Preferably, the electronic unit is connected to all devices of the apparatus in order to monitor and/or control their operation. In preferred embodiments, the electronic unit is an electronic processing and control unit, advantageously comprising one or more computers. The various parts to which it is connected are monitored and controlled by sensors, detectors and interfaces that are of a known type and therefore are not discussed here in detail.

The electronic unit is programmed to determine a position of an optimised rotation axis of the log 2 placed in the loading station 8 and to control the interaction of the cutting station 9, the loading station 8 and the transfer device 10 to position the log 2 in the cutting station 9 by having the first rotation axis 13 coincide with the optimised rotation axis. The optimised rotation axis is one of the optimised parameters that may have been determined previously, during an optimisation step, based on data acquired in an examination step performed when the log 2 was in a position related to the reference position. The position of the optimised rotation axis is defined by an offset relative to a longitudinal axis of the log 2, where the offset is fully identified if its distance from the longitudinal axis and the angular orientation of the radial line on which it lies are known. However, the angular orientation of this line is related to the angular orientation of the log 2 placed on the supporting member 6.

In addition, the electronic unit may also be programmed to determine an initial angular position to be assumed by the log 2 in the cutting station 9 prior to starting the cutting operations.

The electronic unit is programmed to control the interaction of the cutting station 9, the loading station 8 and the transfer device 10 in such a way as to position each log 2 in the cutting station 9 by having the first rotation axis 13 coincide with the optimised rotation axis determined for that log 2.

In some embodiments, the electronic unit is additionally connected to the loading station 8, the cutting station 9 and/or the log transfer device 10 to control their reciprocal movement. In that case, once the electronic unit has identified the position of the optimised rotation axis relative to the log 2 held by the second spindles 15, and possibly also the cut start position, this is programmed to control their reciprocal movement in such a way that the log transfer device 10 feeds each log 2 into the cutting station 9 by aligning the optimised rotation axis with the first rotation axis 13. To this end, the electronic unit may, for instance, simultaneously control the rotation of the second spindles 15 (or more generally of the axial rotation device 5) and the position of the supporting member 6 to position the log 2 relative to the transfer device 10 placed in the pickup position in such a way that the subsequent movement of the transfer device 10 to the release position brings the log 2 between the first spindles 11 with the optimized rotation axis aligned with the first rotation axis 13. Once the electronic unit has identified the position of the optimised rotation axis relative to the log 2 held by the second spindles 15, and possibly also the cut start position, the apparatus is configured to hold the log 2, which is always mechanically secured and controlled until the end of the cutting procedure.

Advantageously, then, the loading station 8, the log transfer device 10 and/or the cutting station 9 are reciprocally movable in such a way that the first rotation axis 13 can be positioned in a plurality of different positions relative to the log 2, irrespective of the position that the second rotation axis 14 has relative to the log 2 in the loading station 8.

The device 5 associated with the loading station 8 therefore allows the angular orientation of the log 2 to be determined relative to that which it had when the data used for optimising the cutting parameters were acquired, and this information is then used by the electronic unit to transfer the log 2 to the cutting station 9 by making the optimised rotation axis coincide with the first rotation axis 13 defined by the first spindles 11.

The operation of a peeling apparatus 7 made in accordance with the present description is schematically shown in the attached FIGS. 2 to 12.

With the second spindles 15 in the second rest position, a log 2 is positioned in the loading station 8. The second spindles 15 are then moved to the second working position, clamping the log 2 between them. Subsequently, the axial rotation device 5 rotates the log 2 on itself in such way that position of the log 2 is known to the electronic unit (FIGS. 2-4). As the log 2 rotates, the second cameras acquire a plurality of second digital photographs of the lateral surface 1 of the log 2 and send them to the electronic unit. For each acquisition, the electronic unit also stores the relative (angular) position of the log 2.

Figure 6:
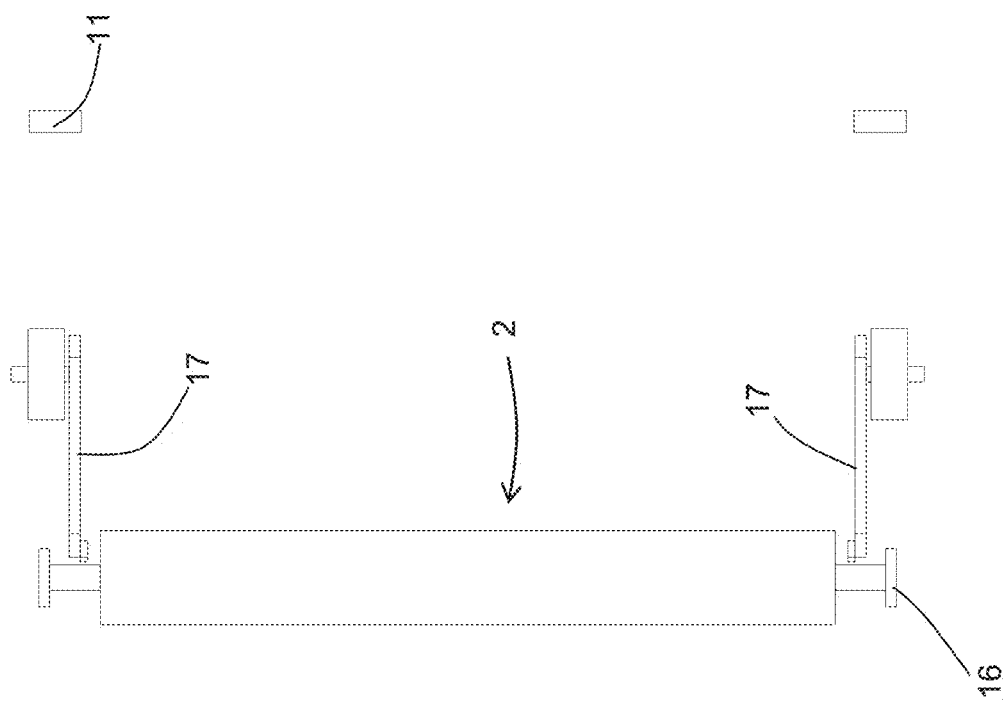
FIG. 6 shows a view from above of some parts of the apparatus in FIG. 2, during the second work step in FIG. 5.
Figure 11:
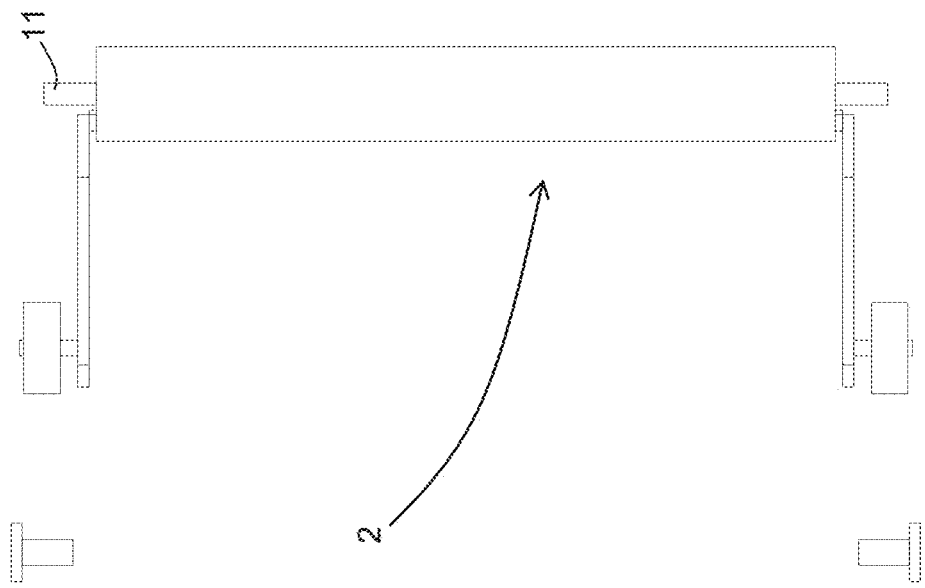
FIG. 11 shows a view from above of a subsequent sixth work step.

Once the second acquisition step is completed, the electronic unit performs the second generation step and, thereafter, the comparison and determination steps to identify the angular orientation of the log 2 relative to that which the log 2 had at the reference position in which the optimised axis of rotation was determined. Knowing the position that the optimised rotation axis had in the reference position, and knowing how the angular orientation of the log 2 has changed in its passage to the second position, the electronic unit is then able to identify the position of the optimised rotation axis relative to the second rotation axis 14. At that point, the electronic unit determines the roto-translation that the log 2 must undergo to be positioned correctly so that it can be subsequently grasped by the transfer device 10. Once both the rotation and translation have been determined, the electronic unit drives the supporting body 16 to translate the log 2 (according to the arrow 21 in FIG. 5) and drives the second spindles 15 to rotate it, so positioning it in the correct position between the movable arms 17 of the transfer device 10 placed in the pickup position and spaced apart (FIG. 6).

Figure 7:
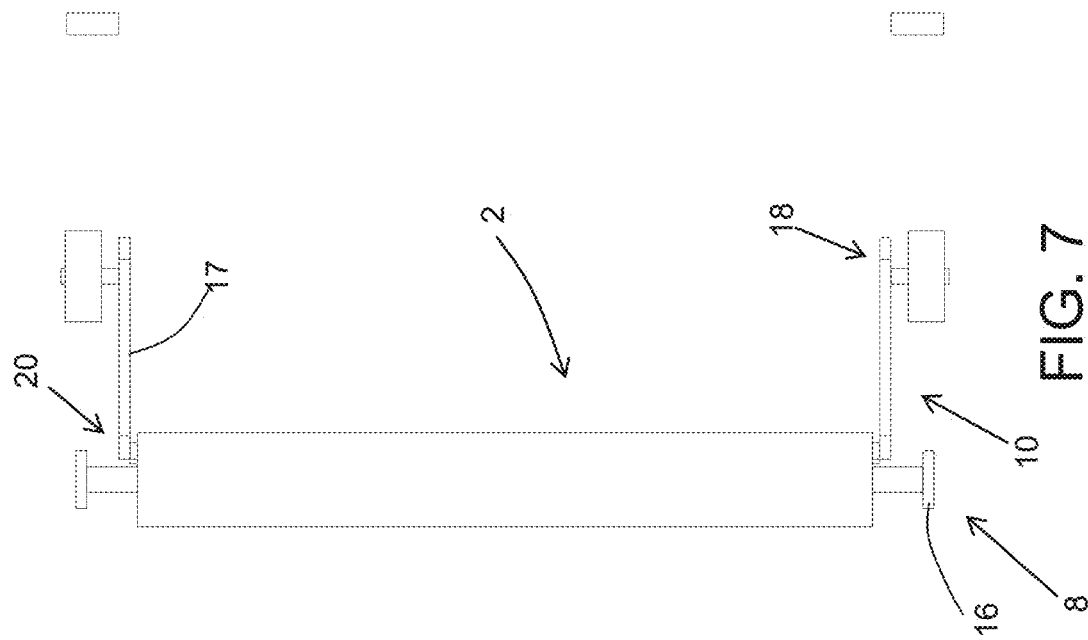
FIG. 7 shows a view from above of the parts in FIG. 6, during a third work step subsequent to the second work step.

The movable arms 17 are then brought closer to each other until they jam the log 2 (FIG. 7). At that point, the second spindles 15 move into the second rest position (FIG. 8) and the supporting body 16 can return them to the starting position where they can pick up a new log 2 that is fed into the loading station 8.

Figure 10:
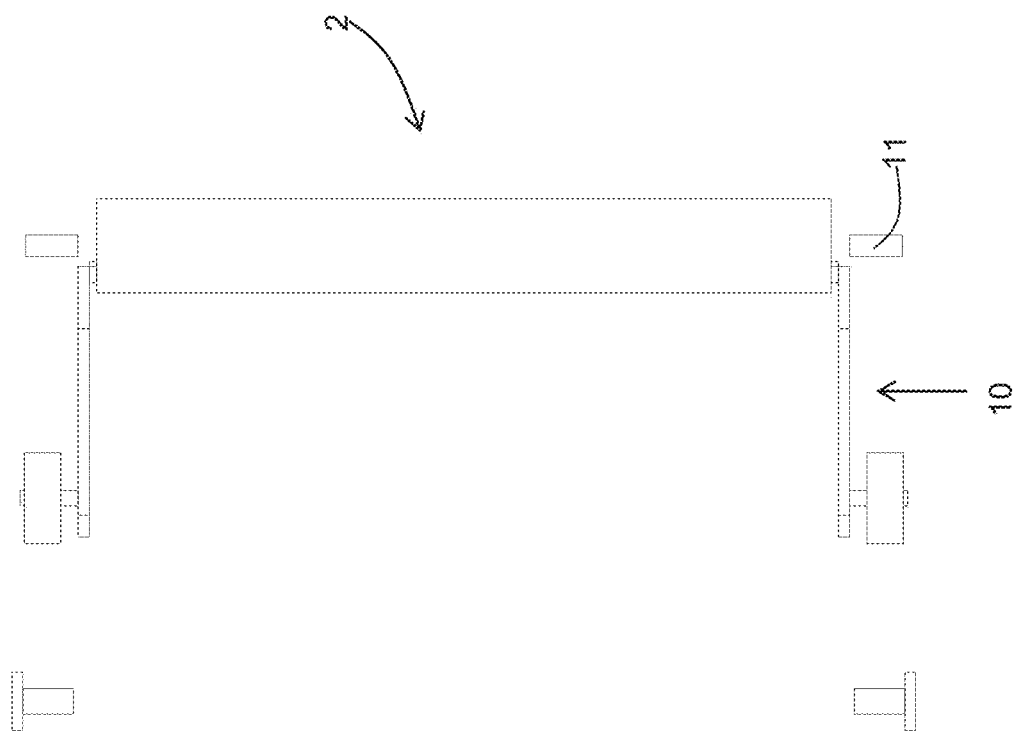
FIG. 10 shows a view from above of the end position in FIG. 8.
Figure 12:
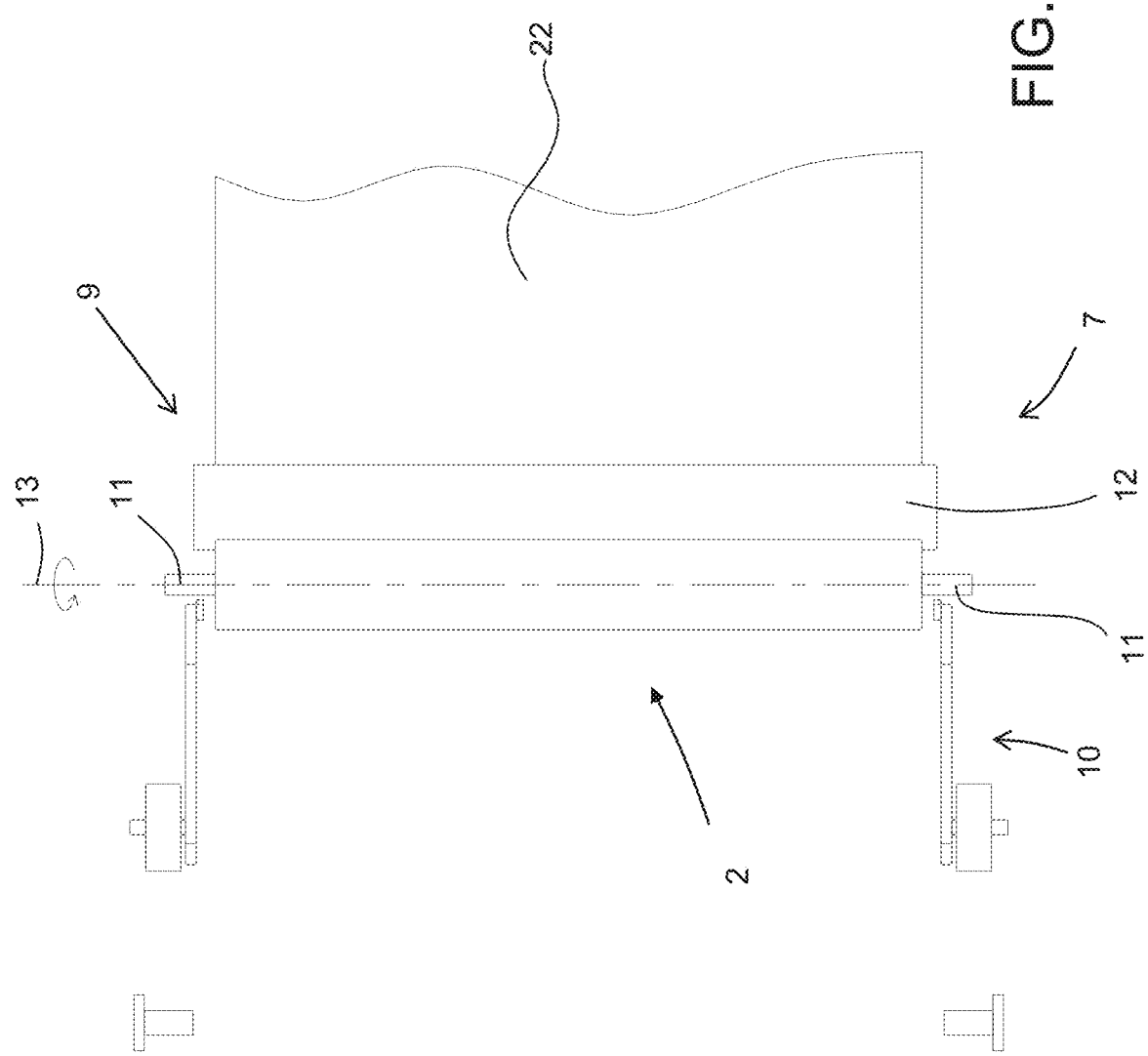
FIG. 12 shows a view from above of a subsequent seventh work step.

The electronic unit activates the transfer device 10, which brings the movable arms 17 from the pickup position to the release position, where the log 2 is positioned between the first spindles 11 placed in the relative first rest position (FIGS. 9 and 10—in FIG. 9, for illustration purposes only, the cutting device 5 is also shown in dashed lines, although at this stage it is not yet activated). The optimised rotation axis is aligned with the rotation axis of the first chicks 11 (which is to say, the first rotation axis 13).

The first spindles 11 switch to the first working position (FIG. 11) and then the movable arms 17 move away to release the log 2.

At that point, the cutting device 5 is brought closer to the rotating log 2 (FIG. 12—possibly in such a way as to start cutting at the predetermined start cutting position) and the production of the sheet wood 22 begins.

The present invention offers significant advantages.

Indeed, thanks to the present invention, it has been possible to implement a method and a device for determining an angular orientation of a log, which can be adopted irrespective of whether the end faces of the log are visible and which can be used successfully also for logs which have an extremely regular lateral surface such that the log is not recognisable by way of three-dimensional profiling.

Finally, it is worth noting that the present invention is relatively easy to make and that the cost associated with its implementation is also not very high.

The invention described above may be modified and adapted in several ways without thereby departing from the scope of the inventive concept.

All details can be replaced by other technically equivalent details and any materials, shapes and dimensions of the various components may be used according to requirements.

The invention claimed is:

1. Method for determining an angular orientation of a log about a longitudinal development axis of the log, the method comprising the following work steps:
   a first acquisition step performed by one or more first digital cameras, during which one or more first digital photographs are acquired of the lateral surface of the log placed in a reference position, the one or more first digital photographs showing the outer appearance of the lateral surface of the log, and wherein each first digital photograph is acquired by observing the log from a relative first known viewpoint position;
   a second acquisition step performed by one or more second digital cameras, during which one or more second digital photographs are acquired of the lateral surface of the log placed in a second position, the one or more second digital photographs showing the outer appearance of the lateral surface of the log, and wherein each second digital photograph is acquired by observing the log from a relative second known viewpoint position;
   a first generation step performed by an electronic unit, during which one or more first digital images are generated of the lateral surface of the log placed in the reference position, using the one or more first digital photographs;
   a second generation step performed by said or another electronic unit, during which one or more second digital images are generated of the lateral surface of the log placed in the second position, using the one or more second digital photographs;
   a comparison step performed by said or another electronic unit, during which the one or more second digital images are compared with the one or more first digital images to identify a match between a second digital image of the log placed in the second position and a first digital image of the log placed in the reference position; and
   a determination step performed by said or another electronic unit, during which the angular orientation of the log in the second position is determined, with reference to a reference angular orientation of the log in the reference position, based on information related to the first digital images and the second digital images for which a match was identified.

2. Method according to claim 1, wherein the determination step is carried out by processing stored information relating to the first viewpoints and the second viewpoints from which were acquired, respectively, the first digital photographs and the second digital photographs, which were used to generate the first digital images and the second digital images, respectively, for which the match was identified.

3. Method according to claim 1, wherein the one or more first digital images coincide with first digital photographs or wherein the one or more second digital images coincide with second digital photographs.

4. Method according to claim 1, wherein, during the first generation step performed by the electronic unit, the one or more first digital images are created by generating first virtual digital photographs of the lateral surface of the log placed in the reference position by way of processing first digital photographs acquired from different viewpoints or wherein, during the second generation step performed by the electronic unit, the one or more second digital images are created by generating second virtual digital photographs of the lateral surface of the log placed in the second position by way of processing second digital photographs acquired from different viewpoints.

5. Method according to claim 1, wherein, respectively:
   in the first generation step a plurality of first digital images of the log placed in the reference position are generated and in the second generation step only one second digital image of the log placed in the second position is generated; or
   in the second generation step a plurality of second digital images are generated and in the first generation step only one first digital image is generated.

6. Method according to claim 1, wherein, respectively, the first digital photographs or the second digital photographs are acquired in such a way that at least one photograph is acquired for each point of an entire tubular portion of the lateral surface of the log.

7. Method according to claim 1, wherein, during the second acquisition step, the log is rotated about an axis parallel to the longitudinal development axis, and wherein the second digital photographs are acquired using one or more second digital cameras, which are fixed relative to the axis about which the log rotates.

8. Method according to claim 1, further comprising a compensation step performed by said or another electronic unit, respectively, in conjunction with the first acquisition step or the second acquisition step, and during which, respectively, the one or more first digital photographs or the one or more second digital photographs are processed based on known information, in such a way that the first digital photographs and the second digital photographs appear as if they had been obtained from viewpoints identically distanced from the longitudinal development axis.

9. Method according to claim 1 wherein the log in the second position comprises an axial piece of a log larger than that on which the first acquisition step was performed at in the reference position.

10. Method according to claim 1, wherein the first acquisition step and the first generation step are performed for a plurality of distinct logs placed one at a time in a reference position, wherein during the comparison step the one or more second digital images of the log in the second position are compared to the one or more first digital images relating to at least one part of said plurality of logs to identify a match between a second digital image of the log placed at the second position and a first digital image of one log out of the plurality of logs placed at the reference position, and wherein, during the determination step, the log placed in the second position is further identified with the log out of the plurality of logs to which the first digital image relates and for which a match with a second digital image has been identified.

11. Use of a method according to claim 1 in a procedure for processing a log, wherein the process comprises the following steps:
- an examination step during which the log is examined to determine features of interest;
- an optimisation step, during which optimised parameters for processing the log are determined, including an optimised positioning;
- a positioning step, during which the log is oriented according to the optimised positioning; and
- a processing step during which the log, originating from the optimised positioning, is processed based on the previously determined optimised parameters;
- wherein the method for determining the angular orientation is used to determine the angular orientation of the log prior to performing the positioning step, wherein the reference position is associated with the position of the log during the examination step, wherein the log is in the second position prior to the start of the positioning step, and wherein the positioning step is performed taking into account the angular orientation of the log determined during the determination step.

12. Use according to claim 11, wherein the examination and positioning steps are performed at different points of the same processing plants or at different plants.

13. Use according to claim 11, wherein the processing comprises an operation of peeling the log to produce a continuous sheet of wood or a different operation of cutting the log.

* * * * *